3,166,602
PROCESS FOR PREPARING DICHLOROETHANES
Keith M. Taylor, Dickinson, Tex., assignor to Monsanto Company, a corporation of Delaware
No Drawing. Filed Feb. 21, 1961, Ser. No. 90,617
2 Claims. (Cl. 260—662)

The present invention relates to a process for the chlorination of ethane under conditions such that the predominant products of the reaction are chlorinated ethanes.

It has long been known that ethane could be chlorinated to yield valuable materials such as ethyl chloride, the dichlorethanes, and even higher chlorinated ethane compounds such as the trichloroethanes. However, in most of the processes described in the prior art, it has not been possible to produce the dichloroethanes in good yields by means of the thermally initiated chlorination reaction. This substitution chlorination process has been beset by problems such as carbon deposition within the reaction zone and/or extensive pyrolysis of the desired chloroethane products to produce other compounds such as ethylene, vinyl chloride, hydrogen chloride and the like. Accordingly, a practical, simple process for the chlorination of ethane to chloroethanes has long been needed.

It has now been discovered that the dichloroethanes can be produced in excellent yield in a "clean" reaction, i.e., with no appreciable formation of tar or decomposition products, if the direct vapor-phase chlorination of ethane is conducted under a specified set of conditions not heretofore employed. According to the invention, dichloroethanes are the principal product obtained by chlorinating ethane under the following conditions; (1) a molar ratio of chlorine to ethane of 1:5 to 5:1 is employed; (2) the reaction temperature is regulated in the range from about 485° C. to about 600° C.; (3) the average residence time of the gases in the reaction zone is maintained between about 1 and about 100 milliseconds; and (4) an inert diluent gas is admixed with the reaction gases in sufficient amount by volume to maintain the gas mixture outside of the flammable region.

The invention is illustrated in the following example which, however, is not to be construed as limiting it in any manner whatsoever.

Example 1

A series of runs was made in which ethane was reacted in the vapor phase directly with chlorine. The reactor employed was an 0.8 cm. O.D. quartz tube of the length required to give the desired reaction time. Heat was supplied to a ½-in. section of the tube by means of five turns of nichrome wire with the voltage to the heating wire being controlled by a Variac. Reaction zone temperature was determined with a thermocouple in a 3 mm. O.D. quartz tube centered in the reactor. Ethane and chlorine in the desired mole proportions were premixed with approximately 50% by volume of helium and passed through the heated reactor at a rate to give the desired average residence time in the reaction zone. The effluent gases from the reactor were passed consecutively through brine-cooled condensers, scrubbed with aqueous caustic, and passed through Dry-Ice traps. Non-condensed gases were vented to the atmosphere. The condensed products were combined, weighed and then analyzed by means of a Perkin-Elmer Model 154 gas chromatograph. Ethane conversions and the principal products of the reaction are tabulated together with the conditions under which they were obtained in Table I below. No ethyl chloride was produced in any of the runs.

| Run No. | Charge $Cl_2$ | (Moles) $C_2H_6$ | Temp. (° C.) | Time (Milliseconds) | $C_2H_6$ Conversions to (Mole percent) | | |
|---|---|---|---|---|---|---|---|
| | | | | | All Prod. | $C_2H_4Cl_2$ | $C_2H_3Cl_3$ |
| 15 | 1.0 | 1.0 | 500 | 4 | 40.0 | 36.2 | 2.1 |
| 9 | 3.0 | 1.0 | 500 | 4 | 96.7 | 78.8 | 17.2 |
| 21 | 1.0 | 1.0 | 500 | 8 | 56.0 | 52.7 | 1.1 |
| 6 | 3.0 | 1.0 | 500 | 8 | 75.5 | 61.9 | 13.7 |
| 26 | 2.0 | 1.0 | 525 | 2.8 | 39.4 | 25.3 | 13.8 |
| 23 | 0.4 | 1.0 | 525 | 6 | 21.4 | 16.4 | 2.2 |
| 4 | 2.0 | 1.0 | 525 | 6 | 87.7 | 76.0 | 11.8 |
| 1 | 1.0 | 1.0 | 550 | 4 | 40.0 | 39.4 | 0.5 |
| 2 | 3.0 | 1.0 | 550 | 4 | 91.0 | 74.6 | 16.5 |
| 3 | 3.0 | 1.0 | 550 | 8 | 60.0 | 45.7 | 14.3 |
| 22 | 2.0 | 1.0 | 565 | 6 | 82.2 | 61.2 | 20.1 |

It is apparent from the foregoing data that under properly controlled conditions excellent yields of the dichloroethanes can be obtained by the direct chlorination of ethane with minimization of the amount of trichloroethane simultaneously produced. These yield advantages together with the exclusion of ethyl chloride as a product and the distinct process advantages of a water-white product containing very little or no tar or other decomposition products are attributable for the most part to the ultra short residence times used. Such extremely short residence times have not heretofore been employed in this chlorination reaction.

Conditions varying from those given in the example can be employed without departing from the scope of the invention. For example, the reaction can be conducted at temperatures as low as 485° C. and up to about 600° C. although the preferred temperatures lie in the range from about 500° C. to about 550° C.

Likewise, while preferred residence times are those from about 4 to about 40 milliseconds, residence times varying from 1 to 100 milliseconds can be used.

The mole ratio of chlorine to ethane employed is not too significant with respect to the course of the reaction although this variable has some effect on the conversion of ethane. Higher chlorine-to-ethane ratios tend to result in higher conversions of ethane but at the same time tend to increase the production of trichloroethane. Thus, while chlorine ratios of 1:5 to 5:1 can generally be employed, those ratios from about 1:1 to about 3:1 are preferred.

The particular inert diluent employed does not materially affect the yield of products obtained. Suitable diluent gases which can be employed in addition to helium include carbon dioxide, nitrogen, argon, hydrogen chloride and the like.

Slight variations in reaction conditions from those specified for the process of the invention produce small quantities of ethyl chloride. This by-product can be readily recycled, however, since it has been found that ethyl chloride behaves in the same way as ethane itself in the process being converted principally to dichloroethanes.

What is claimed is:
1. A process for the chlorination of ethane to produce dichloroethanes which comprises reacting chlorine and ethane in mole proportions of from about 1:1 to 3:1 in a reaction zone heated to a temperature in the range from about 500° C. to about 550° C., said gaseous mixture of chlorine and ethane being diluted with 50% by volume of an inert gas and the residence time of the reacting gas mixture in the reaction zone being maintained within the range from about 4 to about 8 milliseconds.

2. A process for the chlorination of ethane to produce dichloroethanes which comprises reacting chlorine and ethane in mole proportions of about 1:1 in a reaction zone heated to a temperature of about 550° C., said gaseous mixture of chlorine and ethane being diluted with 50% by volume of helium and the residence time of the reacting gas mixture in the reaction zone being maintained at approximately 4 milliseconds.

References Cited in the file of this patent

UNITED STATES PATENTS

| 2,334,033 | Riblett | Nov. 9, 1943 |
| 2,442,324 | Heitz et al. | May 25, 1948 |
| 2,628,259 | Dirstine et al. | Feb. 10, 1953 |
| 2,838,579 | Conrad et al. | June 10, 1958 |
| 2,989,571 | Eisenlohr | June 20, 1961 |